United States Patent [19]
Ballé et al.

[11] Patent Number: 4,608,214
[45] Date of Patent: Aug. 26, 1986

[54] PROCESS FOR THE PRODUCTION OF OPTIONALLY CELLULAR MOLDINGS

[75] Inventors: Gerhard Ballé, Leverkusen; Reiner Paul, Muelheim; Werner Rasshofer, Cologne, all of Fed. Rep. of Germany

[73] Assignee: Bayer Aktiengesellschaft, Leverkusen, Fed. Rep. of Germany

[21] Appl. No.: 685,187

[22] Filed: Dec. 21, 1984

[30] Foreign Application Priority Data

Dec. 30, 1983 [DE] Fed. Rep. of Germany ....... 3347573

[51] Int. Cl.$^4$ .............................. C08J 9/34; C08J 9/14; C08G 18/14
[52] U.S. Cl. ................................. 264/45.5; 264/45.3; 264/53; 264/DIG. 83; 428/318.8; 521/51; 521/137
[58] Field of Search ..................... 264/45.3, 45.5, 53, 264/DIG. 83; 521/51, 137; 428/318.8

[56] References Cited

U.S. PATENT DOCUMENTS

| | | |
|---|---|---|
| 2,602,783 | 7/1952 | Simon et al. |
| 3,085,983 | 4/1963 | Hardy . |
| 3,586,649 | 6/1971 | Cobbledick . |
| 4,022,856 | 5/1977 | Maxey .................. 264/45.3 X |
| 4,064,410 | 12/1977 | Roach .................... 310/211 |
| 4,065,410 | 12/1977 | Schäfer et al. ............. 521/51 |
| 4,218,543 | 8/1980 | Weber et al. ............. 521/51 |
| 4,261,877 | 4/1981 | Vogt . |
| 4,442,236 | 4/1984 | Rasshofer et al. ........... 521/130 |
| 4,448,903 | 5/1984 | Liang et al. ............... 521/137 |
| 4,576,970 | 3/1986 | Ganster et al. ............. 521/51 |

FOREIGN PATENT DOCUMENTS

| | | |
|---|---|---|
| 2922769 | 12/1980 | Fed. Rep. of Germany . |
| 969114 | 9/1964 | United Kingdom . |
| 1129284 | 10/1968 | United Kingdom . |
| 1477333 | 6/1977 | United Kingdom . |

OTHER PUBLICATIONS

Kunststoffe 60, pp. 3–7, by Dr. Hans Wirtz, Jan. 1970.

*Primary Examiner*—Philip Anderson
*Attorney, Agent, or Firm*—Gene Harsh; Joseph C. Gil; Thomas W. Roy

[57] ABSTRACT

The present invention is directed to a process for the production of optionally cellular, polyurethane and/or polyurethane-urea moldings having an impervious skin by reacting in a closed mold a reaction mixture containing (a) at least one organic polyisocyanate,
(b) at least one compound which has a molecular weight of about 400 to 12,000 and at least two isocyanate-reactive groups, and
(c) optionally at least one compound which has a molecular weight of from 32 to 399 and at least two isocyanate-reactive groups, wherein before the reaction takes place a surface-improving additive (e) is added containing (e1) a liquid and sedimentation-stable polymer dispersion which is produced by the free radical addition polymerization or copolymerization of one or more olefinically unsaturated monomers in a high molecular weight compound having isocyanate-reactive groups of the type mentioned in (b), and optionally (e2) a metal salt of a monocarboxylic acid having at least 8 carbon atoms in the molecule wherein additive (e) is used in a quantity such that about 0.01 to 3 parts by weight of polymer solids of the polymer dispersion (e1) and up to about 2 parts by weight of metal salt (e2) are incorporated per 100 parts of component (b).

10 Claims, No Drawings

PROCESS FOR THE PRODUCTION OF OPTIONALLY CELLULAR MOLDINGS

BACKGROUND OF THE INVENTION

1. Field of the Invention

The present invention relates to a new process for the production of optionally cellular moldings which have an impervious skin, and an improved surface quality.

2. Description of the Prior Art

The production of moldings which have an impervious skin and a cellular core according to the isocyanate-polyaddition process is known in principle (c.f. Kunststoffe 60, pages 3–7 (1970) or DE-AS No. 1,196,864). It is possible to produce elastomeric and also rigid moldings by this process by an appropriate choice of starting materials. If no blowing agents or only small quantities thereof are used in the process, solid moldings are produced. The raw materials are preferably processed according to the so-called reaction injection molding process (RSG or RIM process). This is a filling technique by which liquid starting materials are introduced into closed molds via so-called automatically controlled mixing heads over the shortest time possible. In the production of moldings for the automobile industry, di- and/or tri-functional polyether polyols having for example a molecular weight ranging from 3000 to 7000 and low molecular weight diols such as ethylene glycol and/or butane diol-1,4 or aromatic diamines having sterically hindered amino groups are reacted with polyisocyanates, preferably liquid polyisocyanates or polyisocyanate mixtures of the diphenylmethane series, optionally in the presence of blowing agents (c.f. U.S. Pat. No. 4,218,543 or U.S. Pat. No. 4,065,410). The moldings which are produced in this manner have excellent mechanical properties. It has been found that the moldings occasionally have surfaces which are not completely free of cavities and pores. Surface defects of this type may become visible by rubbing the molding with a colored powder and may be recognized by a brightening, light-scattering effect in contrast to a deep black (inking with graphite) undisturbed surface.

Surface defects of this type in the form of pores or scars, so-called "pin-holes," often have to be primed with a repairing or filling composition and subsequently sanded and polished, possibly degreased prior and subsequent to this, and optionally lacquered, thereby requiring great expenditure for their removal.

Accordingly, it is an object of the present invention to provide a process for the production of polyurethane moldings which do not have surface defects of this type.

This object was achieved by the process according to the present invention which will be described in more detail in the following.

SUMMARY OF THE INVENTION

The invention is directed to a process for the production of optionally cellular polyurethane and/or polyurethane-urea moldings having an impervious skin by reacting in a closed mold a reaction mixture containing
(a) at least one organic polyisocyanate,
(b) at least one compound which has a molecular weight of about 400 to 12,000 and at least two isocyanate-reactive groups, and
(c) optionally at least one compound which has a molecular weight of from 32 to 399 and at least two isocyanate-reactive groups, wherein before the reaction takes place a surface-improving additive (e) is added containing
(e1) a liquid and sedimentation-stable polymer dispersion which is produced by the radical polymerization or copolymerization of one or more olefinically unsaturated monomers in a high molecular weight compound having isocyanate-reactive groups and being of the type mentioned in (b), and optionally
(e2) a metal salt of a monocarboxylic acid having at least 8 carbon atoms in the molecule wherein additive (e) is used in a quantity such that about 0.01 to 3 parts by weight of polymer solids of the polymer dispersion (e1) and up to about 2 parts by weight of metal salt (e2) are incorporated per 100 parts of component (b).

DETAILED DESCRIPTION OF THE INVENTION

The preferred amount of component (e1) is 0.05 to 1.5 parts of polymer solids per 100 parts of component (b). The polymer solids include the weight of the (co)-polymerized monomer(s), but not the weight of the component (b) dispersing medium. When component (e2) is present, the quantity of polymer solids is preferably limited to this preferred range.

The use of isocyanate group-inert polymers or copolymers in the production of polyurethane foams is already known in principle (GB-PS No. P 1,048,852 or U.S. Pat. No. 3,085,983). In the processes of prior art the polymers or copolymers are simultaneously used as foam stabilizers or cell-regulators. In view of the specified prior publications the effect which may be achieved with the present invention, i.e. that polymers or copolymers of this type have a cell-destabilizing effect, must be considered as being extremely surprising. The polymer dispersions (e1), instead of being foam stabilizers of cell regulators, contribute to a collapse of the cells on the surface and thus give rise to a smoother and defect-free surface.

The liquid dispersions of polymer (e1) in the polyetherpolyols (b), in which these polymers are produced in accordance with the present invention, are stable in storage and easy to convey through pipes, pumps and metering devices. This makes them particularly suitable for use in small scale productions, where they can be incorporated in the polyol component by hand or with a simple mixing apparatus, as well as for machine processing where they can be separately metered into the mixing head or continuously added to the polyol component via an in line mixing aggregate.

Any aliphatic, cycloaliphatic, araliphatic, aromatic or heterocyclic polyisocyanates may be used as starting material (a) in the present process. Examples of suitable polyisocyanates are the compounds which are specified in U.S. Pat. No. 4,065,410, column 2, line 29 to column 3, line 22, the entire disclosure of which is herein incorporated by reference. Preferred starting materials (a) include the derivatives of 4,4'-diisocyanatodiphenylmethane which are liquid at room temperature such as the polyisocyanates which have urethane groups and are obtained according to DE-PS No. 1,618,380 (U.S. Pat. No. 3,644,457) by reacting 1 mol of 4,4'-diisocyanatodiphenylmethane with from about 0.05 to 0.3 mols of low molecular weight diols or triols and preferably polypropylene glycols having a molecular weight of below about 700, or diisocyanates which have carbodiimide and/or uretone imine groups and are based on 4,4'- diisocyanatodiphenylmethane as obtained, by way of example, according to U.S. Pat. Nos. 3,152,162, 3,384,653, 3,449,256, 4,154,752 or DE-OS No. 2,537,685. The preferred polyisocyanates also include the corresponding modification products which are based on mixtures of 2,4'- and/or 4,4'-diisocyanatodiphenylmethane or also mixtures of the above-mentioned modified 4,4'-diisocyanatodiphenylmethanes which have minor quantities of higher than difunctional polyisocyanates of the diphenylmethane series, for example polyisocyanates of the type described in DE-OS No. 2,624,526. The polyisocyantes, which are preferably used according to the present invention, generally are polyisocyanates or polyisocyanate mixtures of the diphenylmethane series, that are liquid at room temperature, optionally chemically modified as described above, and which have an (average) NCO-functionality of about 2 to 2.2, and in particular 2, wherein 4.4'-diisocyanatodiphenylmethane is the main constituent being present in an amount of more than 50% by weight.

The starting material (b) is at least one compound having at least two isocyanate-reactive hydrogen atoms and an (average) molecular weight (calculated from the functionality, i.e the isocyanate-reactive group content) of about 400 to 12,000, preferably about 1000 to 7000 and, in particular, about 2000 to 6000. Di- and/or trifunctional polyether polyols are most preferably used as starting material (b). These polyether polyols are produced in known manner, for example, by the polymerization of tetrahydrofuran or epoxides (such as ethylene oxide, propylene oxide, butylene oxide, styrene oxide or epichlorohydrin) on their own, for example, in the presence of Lewis catalysts such as $BF_3$ or by addition of the epoxides, preferably ethylene oxide and propylene oxide, (optionally in admixture or successively) to starting constituents, which have reactive hydrogen atoms, such as water, alcohols, ammonia or amines. Examples include ethylene glycol, propylene glycol-(1,3) or -(1,2), trimethylol propane, glycerine, sorbitol, 4,4'-dihydroxy-diphenylpropane, aniline, ethanolamine or ethylene diamine. Sucrose polyethers as described in DE-Auslegeschriften Nos. 1,176,358 and 1,064,938 or polyethers started on formitol or formose (DE-Offenlegungsschriften Nos. 2,639,083 or 2,727,951) may be used according to the present invention. In many cases polyethers are preferred which predominantly have primary OH groups, i.e. up to about 90% by weight, based on all the OH groups which are present in the polyether.

The so-called amino polyethers or amino hydroxy polyethers of the above-mentioned molecular weight range are also suitable as starting material (b). Generally, at least about 25, preferably at least about 50 and, in particular, about 80 to 100 equivalent percent of the terminal isocyanate-reactive groups are primary and/or secondary, aromatically or aliphatically bound amino groups, while the remainder are primary and/or secondary, aliphatically bound hydroxyl groups.

In these compounds the terminal moieties which carry the amino groups may also be linked to the polyether chain via urethane or ester groups. These "amino polyethers" are produced in known manner by aminating polyhydroxy polyethers such as polypropylene glycol ethers, with ammonia in the presence of Raney nickel and hydrogen (BE-PS No. 634,741). The production of polyoxyalkylene polyamines by reacting the corresponding polyol with ammonia and hydrogen in the presence of a nickel, copper, chromium catalyst is described in U.S. Pat. No. 3,654,370. The production of polyethers which have terminal amino groups by hydrogenating cyanoethylated polyoxypropylene ethers is described in DE-PS No. 1,193,671. Further methods for the production of polyoxyalkylene-(polyether)-amines are described in U.S. Pat. Nos. 3,155,728, 3,236,895 and FR-PS No. 1,551,605. The production of polyethers which have secondary amino groups is described in FR-PS No. 1,466,708.

Relatively high molecular weight polyhydroxy polyethers may be converted into the corresponding anthranilic acid esters which are suitable according to the present invention as constituent (b) by reaction with isatoic acid anhydride, as described in DE-OS No. 2,019,432, DE-OS No.2,619,840, U.S. Pat. Nos. 3,080,250, 3,975,428 or U.S. Pat. No. 4,016,143. It is possible in this manner to produce polyethers which have terminal aromatic amino groups.

By reacting NCO-prepolymers which are based on polyhydroxy polyethers with enamines, aldimines or ketimines which have hydroxyl groups and subsequently hydrolyzing them, compounds are obtained according to DE-OS No. 2,546,536 or U.S. Pat. No. 3,865,791 which have relatively high molecular weight and terminal amino groups.

Other amino polyethers of the above-mentioned molecular weight range may be obtained according to DE-OS No. 2,948,419 or according to DE-OS No. 3,039,600 and may also be used.

Any mixture of the compounds which are mentioned by way of example and which have isocyanate-reactive groups may of course also be used as starting constituent (b) according to the present invention.

The compounds which have isocyanate-reactive groups and which are useful according to the present invention as starting constituent (b) are not limited to the compounds which have previously been mentioned by way of example.

Thus, by way of example, the compounds which have isocyanate-reactive groups and a molecular weight ranging from about 400 to 12,000 and are described in U.S. Pat. No. 4,218,543, herein incorporated by reference, may also be used in the present process.

The starting compounds (c) which may optionally be used include any chain lengthening agents or cross-linking agents which have at least two primary or secondary amino groups and/or hydroxyl groups and have a molecular weight ranging from 32 (hydrazine) to 399. The corresponding difunctional compounds are preferably used.

The following are examples of compounds of this type: hydrazine, ethylene diamine, hexamethylene diamine, 1-amino-3,3,5-trimethyl-5-aminomethyl-cyclohexane (IPDA), N,N'-dimethylhydrazine, ethylene glycol, propylene glycol-(1,2) and -(1,3), 1,4-dihydroxybutane, 1,6-dihydroxyhexane, glycerine, trimethylolpropane, pentaerythritol, quinitol, mannitol, diethylene glycol, triethylene glycol, tetraethylene glycol, dipropylene glycol, tripropylene glycol, dibutylene glycol, diethanolamine, diisopropanolamine, 1,4-diaminobenzene, 2,4-diaminotoluene or 4,4'-diaminodiphenylmethane.

The compounds which are preferably used as constituent (c) in the present process include diprimary aromatic diamines which have a molecular weight within the above-mentioned range and in particular diprimary aromatic diamines which have at least one alkyl substituent in an ortho-position to each of the amino groups and in particular diprimary aromatic diamines which have at least one alkyl substituent in the ortho-position to the first amino group and two alkyl substituents each of which has from 1 to 3 carbon atoms in the ortho-position to the second amino group and most preferably diprimary aromatic diamines which have at least one ethyl-, n-propyl-, and/or iso-propyl substituent in the ortho-position to each of the amino groups and optionally methyl substituents in other ortho-positions to the amino groups.

The following are examples of preferred or particularly preferred diamines of this type: 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane or 3,5-diethyl-3',5'-diisopropyl-4,4'-diaminodiphenylmethane.

The compounds which are preferably used according to the present invention as constituent (c) include, moreover, aliphatic diols which have a molecular weight ranging from 62 to about 200, such as ethylene glycol, 1,2-dihydroxypropane and 1,4-dihydroxybutane. Any mixtures of alcoholic and/or aminic structural constituents (c) may of course also be used.

The structural constituent (c) is used according to the present process in a quantity ranging from 0 to about 50, preferably from about 10 to 40%, by weight, based on constituent (b).

Auxiliaries and additives which are known from polyurethane chemistry may be simultaneously used as further constituents (d) in the process according to the present invention. These include, by way of example:

1. Blowing agents such as acetone, ethyl acetate and, in particular, halogen-substituted alkanes such as dichloromethane, trichloromethane, monofluorotrichloromethane, chlorodifluoromethane or dichlorodifluoromethane. The use of water is possible in principle, but is less preferred.

2. Catalysts of a known type for the isocyanate polyaddition reaction as described by way of example in U.S. Pat. No. 4,065,410, column 5, line 59 to column 6, line 30.

3. Surface active additives and other additives as described by way of example in U.S. Pat. No. 4,065,410, column 6, line 34 to column 7, line 2.

4. Internal mold release agents as described by way of example in U.S. Pat. No. 3,726,952, GB-PS No. 1,365,215, U.S. Pat. Nos. 4,098,731, 4,058,492, 4,033,912, 4,024,090, 4,098,731, 4,374,222 and/or U.S. Pat. No. 4,111,861.

Further examples of auxiliaries and additives which may be used according to the present invention include surface-active additives and foam stabilizers, flame-retardant additives, plasticizers, dyes and fillers and substances which have a fungistatic or bacteriostatic effect. Details about the use and effect of these additives are described in the Kunststoff-Handbuch, Vol. VII, Vieweg and Höchtlen, Ed., Carl-Hanser-Verlag, Munich 1966, on pages 103 to 113.

A characteristic which is essential to the present invention is the use of the surface-improving additives (e1), optionally in admixture with (e2).

Consituent (e1) is a liquid polymer dispersion which is easily flowable and sedimentation-stable during storage. The polymer dispersion is obtained by polymerizing one or more olefinically unsaturated monomers in a free radical addition polymerization process using as the polymerization medium a relatively high molecular liquid compound which satisfies the requirements of constituent (b), i.e. it has a molecular weight ranging from about 400 to 12,000 and at least two isocyanate-reactive groups in the molecule. These monomers include $C_{1-18}$ alkyl esters of acrylic acid and/or methacrylic acid which may be used in combination with up to about 50% by weight based on the total monomer mixture, of one or more additional monomers. Preferred acrylic or methacrylic acid esters are esters which have up to 10 carbon atoms in the alkyl radical. The following are examples of acrylic or methacrylic acid esters which are used: acrylic acid-methylester, acrylic acid-ethylester, acrylic acid-n-butylester, acrylic acid-n-pentyl ester, acrylic acid-n-hexylester, acrylic acid-2-ethylhexylester, acrylic acid-decylester, acrylic acid dodecylester, acrylic acid octadecylester, or the corresponding methacrylic acid esters. Examples of other monomers are any olefinically unsaturated, isocyanate group-inert compounds such as $C_{2-18}$-α-olefins, styrene, itaconic acid esters, maleic acid esters, vinyl acetate, diallyl phthalate, acrylonitrile or methacrylonitrile.

The high molecular weight compounds which have already described as constituent (b), having at least two isocyanate reactive end groups in the molecule serve as the polymerization medium, polyether polyols having a functionality of 2 and/or 3 being preferred. It is appropriate to use the same or a similar polyether polyol as is already contained in the reaction mixture as constituent (b) to serve as medium for polymerization.

Polymerization is carried out in such a way that the polyether polyol (b) is heated under nitrogen to a polymerization temperature of about 40 to 180° C., preferably about 40 to 120° C. and most preferably about 40 to 100° C. and the monomer or monomers together with the radical polymerization initiator are added with stirring in such a way that the selected temperature may be easily maintained by cooling or heating means. Alternatively, only part of the polyetherpolyol may be present in the reactor at the start, and the remainder may be introduced into the polymerization zone in admixture with the monomer or monomers. It is also possible to use minor quantities of a solvent which is removed by distillation on completion of polymerization along with unreacted residues of the monomer or monomers which are still present.

The following are suitable as solvent: methylene chloride, ethanol, isopropanol, n-propanol, n-butanol, isobutanol, tert.-butanol, acetic acid esters of lower alcanols, e.g. $C_{1-4}$-alcohols, acetone, methylethyl ketone, benzene, toluene, etc.

Polymerization is preferably carried out without the addition of solvents except that a relatively high boiling solvent may be added as an entrainer to distill off the remaining monomers.

The following are examples of initiators, which may be used in a quantity of about 0.1-3% by weight, based on monomers: Percarbonates, peresters such as tert.-butyl perpivalate or -peroctoate, benzoyl peroxide, o-methoxybenzoyl peroxide, dichlorobenzoylperoxide or azo compounds such as azo isobutyric acid nitril (AIBN). The quantity of initiator is preferably limited to a maximum of about 1.5% by weight, based on monomers. Combinations of several initiators which have a varied activity, may possibly be used to combine a rapid start of polymerization with a prolonged supply of radicals for polymerization of the monomers which should be carried to a monomer conversion as high as possible.

The ratio of monomer and polyether polyols is appropriately selected in such a way that a polymer content of from about 5 to 50% by weight, preferably from about 10 to 30% by weight, based on the total weight of additive (e1), is obtained.

The use of the resulting dispersions has various advantages when compared to the use of polymers in substance or in solution which are obtained in another manner. The neat polymers obtained by solution, emulsion, or mass polymerization from relatively high molecular weight acrylic or methacrylic acid esters and optionally other monomers generally have such a high molecular weight that they may still be liquid but can no longer be transported through pumps and pipes on account of their high viscosity and may be homogeneously mixed into the reaction mixture or one of the constituents thereof only with great difficulty. Mixing is made even more difficult by the fact that the quantities which are used are relatively small in comparison with the main consituents of the reaction system. This fact may give rise to metering errors and a lack of homogeneity in the formulation.

It may of course be possible to dilute polymers of this type with an organic solvent to thereby improve their mixability and pumpability and the exactness of metering. This, however, would necessitate removal of the solvent after the solution has been introduced into the reaction thereby demanding a further stage of processing, unless the solvent can assume another function in the reaction mixture, such as that of a blowing agent. In this instance, the allowable quantities of solvent are limited by the nature of the formulation so that the desired viscosity may not be reached with the maximum amount of solvent allowed.

If only slightly foamed or even solid noncellular moldings are produced according to the reaction injection molding process, the presence of even small quantities of volatile solvents is undesirable.

In contrast, the polymer dispersions (e1) which are used according to the present invention can be easily introduced into the reaction mixture with greater metering exactness and may be homogeneously mixed therein on account of their relatively low viscosity. They can be produced in the absence of solvent and may be handled in such a way as to make an additional distillation stage unnecessary and so as not to limit the scope of the processor in metering the formulation.

The attempt of forming a dispersion in the selected polyether polyol from the polymer as such or from a solution thereof in a volatile, organic solvent (optionally while distilling off the solvent) fails because unlike the dispersion which are used in the present invention, polymer dispersions which are produced in this manner are not stable in storage or sedimentation-stable and soon separate into component phases because of the strong incompatibility of the acrylic polymers and the polyether polyols. The resulting polymer phase cannot be dispersed again even with conventional mechanical dispersing means. After a short period of storage (several days) this can already give rise to serious metering errors and greater waste during processing.

Constituent (e2) comprises metal salts of a monocarboxylic acid having a total of at least 8, preferably from 8 to 18 carbon atoms. The carboxylic acids are preferably aliphatic or cycloaliphatic carboxylic acids (optionally olefinically unsaturated) such as octane carboxylic acid, dodecane carboxylic acid, stearic acid, oleic acid, linoleic acid, linolenic acid, talloleic acid, arachidonic acid, myristinic acid, palmitic acid, margaric acid, arachic acid, cerotinic acid, melissic acid, erucic acid, dimeric fatty acids, abietinic acid or naphthenic acids. The metal salts preferably contain metals of the first to third group and the second subsidiary group respectively of the Periodic Table of the Elements.

Thus the addtives (e2) are salts of, for example, alkali metals, preferably sodium or potassium, salts of alkaline earth metals, preferably magnesium salts of aluminum or salts of zinc. The zinc salts are particularly preferred.

Constituent (e2) is generally used in a quantity of from about 0.01 to 2, preferably from about 0.05 to 1, weight percent, based on constituent (b).

When the process according to the present invention is carried out the reaction constituents are used in quantities resulting in an isocyanate index of about 70 to 130, and preferably about 90 to 110. The term isocyanate index is to be understood in this instance as designating the quotient of the number of isocyanate groups divided by the number of isocyanate-reactive groups, multiplied by 100. When calculating the isocyanate index the isocyanate-reactive carboxyl groups which are optionally present in the mold-release agents are not included.

The process according to the present invention is preferably carried out according to known reaction injection molding technology (RSG or RIM process). Two component streams are generally used. In this case the polyisocyanate constituent (a) forms the first and the isocyanate-reactive constituents, i.e. the mixture of constituents (b) and (c), form the second stream. The optional constituent (d) and the constituent (e) are generally admixed with the isocyanate-reactive constituents. However, as when mold release agents which have isocyanate groups are used. They may be incorporated into the polyisocyanate constituent (a) before the process according to the present invention is carried out. It is, of course, also possible in principle to use mix heads which enable 3 or 4 separate streams to be used in the process according to the present invention so that it is not necessary to previously mix the individual constituents. In this instance it is especially advantageous to use the additive (e1) in the form of a stable low viscosity dispersion according to the invention which may be pumped and metered with greater accuracy than the neat polymer. The polyether polyol which is present as the dispersing medium may be taken into account when calculating the quantity of constituent (b) which is required since the polyether polyol used as the dispersing medium corresponds or is at least similar to constituent (b).

The quantity of the mixture which is introduced into the mold is chosen in such a way that the moldings have a density of about 0.1 to 1.4 g/cm$^3$, preferably about 0.2 to 1.3 g/cm$^3$. In particular, when mineral fillers are simultaneously used, moldings which have a density of more than about 1.2 g/cm$^3$ may be produced. The moldings may be removed from the mold after a reaction time of about 5 to 90, preferably about 20 to 60 seconds.

The starting temperature of the mixture which is introduced into the mold is generally about 10° to 60° C., preferably about 20° to 50 ° C. The temperature of the mold is generally about 40° to 100° C., preferably about 50° to 70° C.

In carrying out the processing according to the present invention it is also possible in principle to produce an NCO-prepolymer from constituent (a) and at least some of constituent (b) and/or (c) and to react this prepolymer in a second reaction stage with the remaining quantity of constituent (b) and (c), respectively. A two-stage method of this type is, however, less preferred.

polymerization initiator was added continuously and the mixture was subsequently stirred for 2 hours at the same temperature. Traces of unreacted monomers were distilled off under vacuum. More or less translucent, colorless dispersions with easily pourable consistency were produced. Sedimentation or creaming of the polymer solids was not visible even after long periods of storage.

| Polymer dispersion | 1 | 2 | 3 | 4 | 5 | 6 | 7 |
|---|---|---|---|---|---|---|---|
| Polyol A (g) | 800 | 800 | 800 | 800 | 750 | 750 | 700 |
| EA (g) | 100 | 200 | 75 | 100 | 62.5 | 125 | 75 |
| BA (g) | — | — | 125 | — | — | — | 225 |
| EHA (g) | 100 | — | — | — | 187.5 | 125 | — |
| DMA (g) | — | — | — | 100 | — | — | — |
| TBPO (g) | 1 | — | 2 | 1 | 1.25 | 1.25 | — |
| TBPP (g) | 1 | — | — | 1 | 1.25 | 1.25 | — |
| AIBN (g) | — | 1 | — | — | — | — | 3 |
| Polymerization temperature (°C.) | 60 | 120 | 80 | 80 | 60 | 60 | 120 |
| Viscosity (mPa · s) | 2600 | 1200 | 1800 | 1900 | 2200 | 1900 | 1400 |
| Monomer conversion (gas chromotographically) (%) | 99.2 | 98.7 | 99.0 | 98.2 | 99.0 | 98.2 | 98.5 |

The moldings which are produced according to the present process are distinguishable by an improved, i.e. a more homogeneous surface quality in comparison with corresponding moldings which are produced without the use of constituent (e). The moldings which may be obtained according to the present process are particularly suitable for the production of flexible automobile bumpers and body parts and, for example, consoles, side paneling, or dashboards for the interior of automobiles, and also for the production of bicycle or motorcycle saddles. By a suitable variation of the starting constituents (a) to (d), (in particular if only a relatively small amount of aminic structural constituents is used) flexible shoe soles with a good abrasion and wear behavior and excellent mechanical strength may also be produced.

In the following Examples all percentages refer to percent by weight and all "parts" refer to parts by weight unless otherwise indicated.

The following materials were used in the examples:
Polyol A: Polyether triol, produced by propoxylation and subsequent ethoxylation of trimethylol propane, OH number 27, PO/EO weight ratio=83:17
Polyol B: as A, OH number 35, PO/EO weight ratio=83:17
Polyol C: As A, OH number 28, PO/EO weight ratio=78:22
Polyol D: Polyetherdiol, produced by propoxylation and subsequent ethoxyalation of propylene glycol OH number 28, PO/EO weight ratio=80:20 (PO =propylene oxide, EO =ethylene oxide).
EA=ethylacrylate
BA=n-butylacrylate
EHA=2-ethylhexylacrylate
DMA=decylmethacrylate
TBPO=tert.-butylperoctoate
TBPP=tert.-butylperpivalate The ingredients for the production of the polymer dispersions which were used as additive (e1) are given in the following Table. The following method was used:

200 g of the polyether polyol which was used as the reaction medium were heated in a reaction vessel mounted with a stirrer, a dropping funnel, a reflux condensor with a bubble counter and a gas inlet under a blanket of nitrogen to the polymerization temperature. Over the course of 1 hour a mixture of 600 g of polyol A and 200 g of the monomer or monomers and the

EXAMPLE 1

Individual mixtures of 90 parts of polyol A, 17 parts of ethylene glycol, 5 parts of a carbon black paste (20% carbon black and 80% polyol B), 0.4 parts of triethylene diamine, 0.04 parts of dibutyl tin dilaurate and 1 part of zinc stearate were each mixed with 2.5 parts of polymer dispersions 1-7 with 10 parts by weitht of trichlorofluoromethane to produce the polyol formulation. 100 parts of the formulation were rapidly stirred in a beaker with 99 parts of an isocyanate component which had an NCO content of 23% and was produced by reacting an excess of 4,4'-diisocyanatodiphenylmethane with tripropylene glycol. The expanding foam had a distinct tendency to collapse, i.e. it flowed thickly down the outside wall of the beaker before it hardened. A comparative foam without the addition of the dispersions according to the present invention did not have this effect and hardened to form a regularly shaped foam mushroom. The foams produced according to the invention showed markedly larger pores when cut open than did the foam resulting from the comparative experiment. This preliminary test showed that the dispersions according to the invention which were examined will have a surface-improving effect in mold-foaming because of their ability to induce a collapse tendency in the surface zone.

240 ml samples of each of the reaction mixtures (obtained by combining polyol and polyisocyanate components in the same ratios as above and containing additives 1-7) were stirred for 10 seconds and poured into a sealable aluminum mold heated to 60° C., the inner surface of which was coated with a wax-containing standard mold release agent (P 180 from Acmos), to produce a 20×20×1 cm plate. After 5 minutes plates which had a deep black, compact flawless surface layer were removed from the molds. A comparative experiment which was carried out without the addition of a polymer dispersion and zinc stearate produced a plate with an irregular, dull surface and a substantially thinner surface zone.

EXAMPLE 2

Individual mixtures of 70 parts of polyol D, 20 parts of polyol B, 1 part of ethylene glycol, 14 parts of 1,4-butane diol, 0.3 parts of triethylene diamine, 0.2 parts of dibutyl tin dilaurate and 0.75 parts of zinc stearate were each combined with 5 parts of the polymer emulsions 1–7 and with 8 parts of trichlorofluoromethane to produce polyol formulations. 115 parts of these formulations were each processed with 74 parts of the polyisocyanate which was described in Example 1 under the same conditions to produce plates. The finished plates had flawless surfaces with a compact thick peripheral zone.

EXAMPLE 3

90 parts of polyol A, 25 parts of ethylene glycol, 5 parts of the carbon black paste according to Example 1, 0.6 parts of triethylene diamine, 0.05 parts of dibutyl tin dilaurate, 5 parts of trichlorofluoromethane, 1 parts of polymer dispersion 1 and 1 part of zinc stearate were mixed to produce a polyol formulation.

A mixture of (a) 75 parts of the modified polyisocyanate according to Example 1 and (b) 25 parts of a partially carbodiimidized 4,4'-diisocyanatodiphenylmethane (NCO-content=30%) which mixture had an NCO-content of 24.5% and a viscosity at 25° C. of 300 mPas was used as the polyisocyanate component.

The polyol and the polyisocyanate components were reacted while maintaining a weight ratio of 123:100 (isocyanate index=105) to produce solid moldings. The components were mixed together by using a high pressure piston metering machine (HK 165 from Hennecke, Sankt Augustin) which was provided with a two stream mixing head, and the reaction mixture was poured into a sealed aluminum mold with the dimensions 120×20×0.4 cm. The interior walls of the mold were previously coated with a standard mold release agent (Fluoricon 36/38 from Firma Acmos).

Machine data
Filling time: 1.5 seconds
Temperature of raw material: 35° C.
Temperature of mold: 60° C.
Time in mold: 90 seconds The plates which were removed from the mold had a flawless, smooth, black surface and had the following mechanical properties:

Density (kg/m$^3$): 1020
Hardness (Shore D): 62
Tensile strength (MPa): 28
Elongation (%): 225
G-modulus (MPa):
 −30° C.: 425
 +20° C.: 180
 +65° C.: 80
Bending modulus (MPa): 480
Sag-value (mm; 1h, 120° C.): 8.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an optionally cellular molding which is based on a polyurethane and/or polyurethane-urea and has an impervious surface, by reacting in a closed mold a reaction mixture comprising
   (a) at least one organic polyisocyanate,
   (b) at least one compound which has a molecular weight ranging from 400 to about 12,000 and at least two isocyanate-reactive groups and
   (c) optionally at least one compound which has a molecular weight ranging from 32 to 399 and at least two isocyanate-reactive groups,
   wherein said reaction mixture additionally comprises
   (e1) a liquid and sedimentation-stable polymer dispersion obtained by the free radical addition polymerization or copolymerization of one or more olefinically unsaturated monomers in a compound corresponding to component (b), and optionally
   (e2) at least one metal salt of a monocarboxylic acid having at least 8 carbon atoms
   the polymer solids of component (e1) being present in a quantity of about 0.01 to 3 parts, by weight, based on 100 parts of component (b) and component (e2) being present in a quantity of up to about 2 parts by weight, based on 100 parts of component (b).

2. The process of claim 1 wherein said polyisocyanate is liquid at room temperature and is a polyisocyanate or polyisocyanate mixture of the diphenylmethane series optionally modified to contain carbodiimide, uretone imine and/or urethane groups.

3. The process of claim 1 wherein component (b) is a di- or tri-functional polyether polyol having a molecular weight of about 1000 to 7000.

4. The process of claim 1 wherein component (c) comprises
   (i) at least one aromatic diamine which has at least one alkyl substituent having from 1 to 3 carbon atoms in the ortho-position to a first amino group and alkyl substituents having from 1 to 3 carbon atoms in both ortho-positions to the second amino group, and/or
   (ii) at least one aliphatic diol which has a molecular weight of about 62 to 200
   in an amount of about 10 to 40%, by weight, based on component (b).

5. The process of claim 1 wherein said reaction mixture contains an organic blowing agent.

6. The process of claim 1 wherein said polymer dispersion (e1) is produced by the free radical addition polymerization or copolymerization of about 50 to 100 parts by weight of at least one $C_{1-10}$ alkyl ester of acrylic or methacrylic acid and from 0 to about 50 parts by weight of at least one additional olefinically unsaturated isocyanate group-inert monomer in a di- or trifunctional polyether polyol having a molecular weight of about 1000 to 7000.

7. The process of claim 6 wherein said additional olefinically unsaturated monomer comprises $C_{2-18}$-α-olefins, styrene, an itaconic acid ester, a maleic acid ester, diallyl phthalate, vinyl acetate, acrylonitrile and/or methacrylonitrile.

8. The process of claim 1 wherein component (e2) comprises at least one carboxylate of a Group IA, IIA, IIB or IIIA metal.

9. The process of claim 8 wherein said metal is zinc.

10. The process of claim 1 which comprises reacting component (a) with component (b) or with a mixture of components (b) and (c) according to the one-stage process while maintaining an isocyanate index of about 70 to 130, component (e) being previously mixed with at least one of the reaction components.

* * * * *